United States Patent Office 3,538,432
Patented Nov. 3, 1970

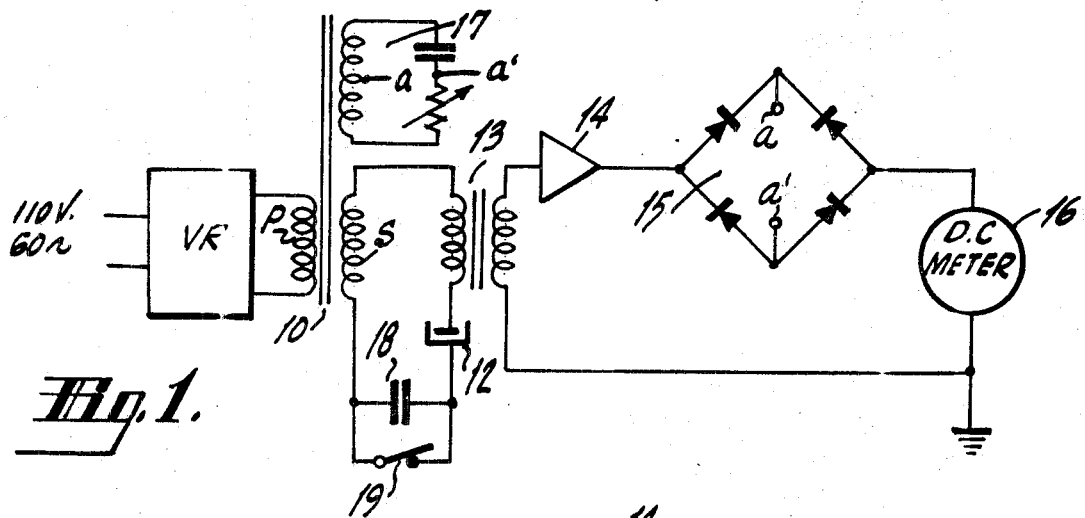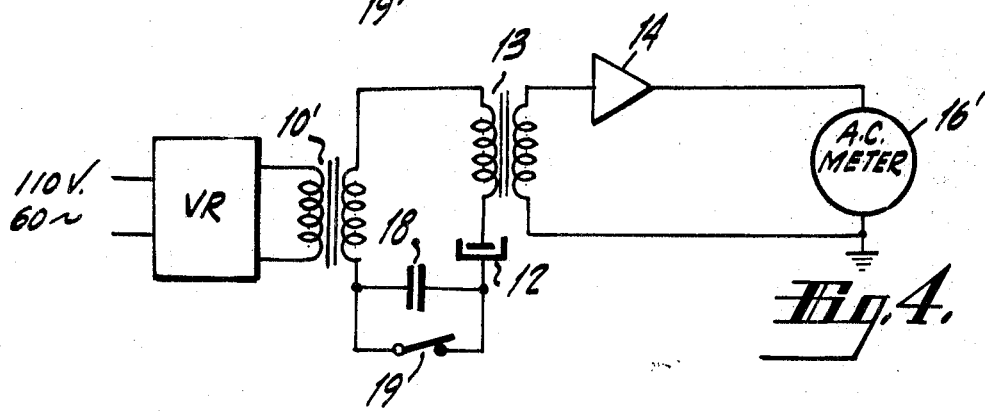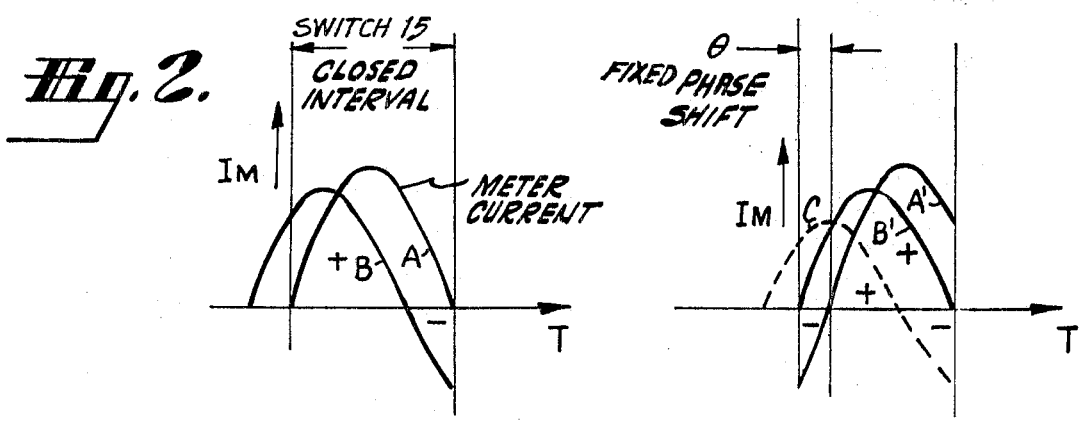

3,538,432
DIRECT READING ELECTROLYTIC CONDUCTIVITY ANALYZER
Charles R. Schmidt, Pequannock, N.J., assignor to Beckman Instruments, Incorporated, Fullerton, Calif., a corporation of California
Filed June 24, 1968, Ser. No. 739,237
Int. Cl. G01m 27/42
U.S. Cl. 324—30                         5 Claims

ABSTRACT OF THE DISCLOSURE

An electrolytic conductivity measuring instrument in the form of a direct reading conductivity analyzer for measuring solution conductance in which means are provided for rapidly determining the condition of the electrical conductivity cell in the instrument. The cell condition can be determined electrically at the instrument without the physical removal of the cell and subsequent inspection. An embodiment of the invention enables compensation of the meter reading for the self-polarization of the cell over a range of conductivity cell conditions.

BACKGROUND

It is known to measure the electrical conductivity of a solution by the use of an instrument having a conductivity cell in its electrical circuit. Such instruments are often used to measure the salinity of sea water, and also fresh water contaminated by sea water, and may utilize an electrical bridge circuit having a conductivity cell connected to one arm of the bridge. The cell may be mounted in an immersion unit electrically connected to the bridge by a cable.

The conductivity cell in its simple basic structure consists typically of two electrodes firmly spaced within an insulating chamber which serves to isolate a portion of the liquid or solution being measured. The electrodes are coated with platinum. During continued use of the cell, the platinum on the electrodes wear off (deteriorate) as a result of which there is introduced an undesirable effective capacitance (called a polarization capacitance) in series with the solution resistance presented to the cell. This deterioration or wear of the cell may be caused by a chemical reaction due to the normal movement of the solution or water past the electrodes and/or mechanical abrasion caused by the movement of suspended particles such as sand in the water. The cell then needs replacement or replatinizing of the electrodes to restore them to the original condition. The alternating current (A.C.) instrument heretofore used in connection with the conductivity cell cannot distinguish between the change in solution resistance or the decrease in capacitance between the electrodes of the cell. Stated in other words, in known direct reading conductivity analyzers the increase in cell polarization (i.e. decrease in series cell capacitance) causes the meter to indicate the solution conductivity incorrectly. In such known analyzers, the solution conductance is indicated as a lower reading on the meter by an amount which is proportional to the increase in impedance caused by the decrease in series cell capacitance.

Among the objects of the present invention are: To enable accurate solution conductance measurements despite a variation in cell series capacitance due to polarization within selected predetermined limits; to compensate electrically within the instrument for the undesired polarization capacitance of the conductivity cell, within a selected range, in a direct reading conductivity analyzer, thereby indicating solution conductance only; and to enable a simple and fast check of the condition of the conductivity cell without the necessity of removing the cell from the instrument and inspecting the same. The removal of cells can often be physically difficult and/or costly in terms of process shut-down.

A feature of the invention is the phase shifter and synchronous switch arrangement for providing electrical compensation to make the meter indication or reading proportional to solution conductance only. Another feature lies in the use of a capacitance with associated short-circuiting switch provided in series with the conductivity cell.

BRIEF DESCRIPTION OF THE DRAWING

Other objects and features will appear from a reading of the following description given in conjunction with a drawing, wherein:

FIG. 1 is a circuit diagram of one embodiment of a solution conductivity measuring instrument of the invention;

FIGS. 2 and 3 are graphical representations given in explanation of the operation of the circuit of FIG. 1; and FIG. 4 is a circuit diagram of another embodiment of the invention.

DETAILED DESCRIPTION

The solution conductivity measuring instrument of FIG. 1 is a direct reading conductivity analyzer provided with a meter the deflection of which is directly proportional to cell conductance. The circuit of the instrument of FIG. 1 comprises an alternating current source providing a voltage of constant magnitude and phase for the range of conductivity cell resistances involved and which is derived through the voltage regulator VR from the 110 volts 60 cycle power mains. A transformer 10 has its primary winding P coupled to the output of the voltage regulator and one of its secondary windings S feeding the voltage of constant magnitude and phase to a current transformer 13. In series with the secondary winding S of transformer 10 and the primary winding of current transformer 13 are a conductivity cell 12 and a condenser 18 which is normally shunted or short-circuited by a manually operated switch 19. The A.C. voltage output from the secondary winding of the current transformer, which may be of the order of 105 volts, is proportional to the current in its primary winding and is fed through a voltage amplifier 14 to a switch or commutator 15. The voltage amplifier 14 increases the power level of the voltage applied to the switch 15. The switch 15 is herein shown as an electrical switch in the form of a bridge of four diodes but can be a suitable mechanical switch. Switch 15 provides rectified signal current for the direct current (D.C.) indicating meter 16. The relation describing the operation is $Im = VA/R$ cell $= Kx$ conductance of cell, where $Im$ is the D.C. meter current through meter 16, $V$ represents the constant magnitude of the voltage at the secondary winding S of transformer 10, $A$ represents the gain of the amplifier 14 and transformer 13 as well as the rectifier efficiency of switch 15, $R$ cell represents the solution resistance present at the cell 12, and $K$ is a constant. Hence, the meter indication is directly proportional to the solution conductance at the cell. An important feature of the invention is the use of and arrangement of the phase shifter 17 in conjunction with the synchronous action of switch 15. It should be noted that the phase shifter is fed from the transformer 10 and hence drives the switch 15 at the same frequency as is applied to the cell 12. Another feature is the combination of the capacitance 18 and its shunting switch 19 provided in series with the conductivity cell 2.

The manner in which the circuit of FIG. 1 operates will now be given with reference to the graphs of FIGS. 2 and 3.

In FIG. 2 curve A shows the meter current for a given solution resistance at the cell with infinite series capacitance (zero polarization). Curve B shows the meter current for the same solution resistance but with high polarization, i.e. low series capacitance due to deterioration of the cell electrodes. Note that the current amplitude is reduced and the phase advanced relative the synchronous switch. The average meter current is further reduced by the presence of the "negative" wave portion of curve B when there is undesired cell polarization. The cell polarization causes the conductivity indication to decrease even though the solution conductance is unchanged in this scheme. By introducing a fixed lagging phase angle $\theta$ as shown in FIG. 3 for a non-polarized cell condition, the meter current curve A′ results. It should be observed that curve A′ has a positive portion and a negative portion. The average value of the meter current is reduced because of the "negative" portion in curve A′. As the cell polarization increases, the amplitude in B is again reduced and shifted forward in phase as previously discussed in connection with the curves of FIG. 2. The decrease in the "negative" portion of the meter current wave A′ due to polarization compensates for the amplitude decrease with increased polarization until the condition represented by meter current B′ is obtained (FIG. 3). Further polarization increase (series capacitance decrease) results in meter current wave C. The appearance of the "negative" portion at the trailing edge of curve C shows the end of the compensation range with a decrease in conductance meter indication. The selection of $\theta$ the fixed phase shift angle due to the components of the phase shift circuit 17 determines the compensation range and accuracy of indication. The capacitor 18 and its shorting switch 9 are an electrical means of simulating increased cell polarization. By opening switch 19, capacitor 18 is inserted in series with the cell. If the cell polarization is such that the combined series capacity brings the meter current wave past the B′ condition of FIG. 3 into the C condition the indicated conductance (meter current) will drop. If the cell polarization is sufficiently low, the insertion of 18 will leave the meter current wave between A and B with little consequent change in reading.

When the cell is fully conducting the meter reading will be a maximum for an established range of the instrument. When the polarization of the cell increases due to electrode deterioration the meter indication will be less than the correct value for the resistance of the solution. The phase shift and synchronous detection scheme of the present invention compensates for this undesired polarization condition within the limits determined by the phase shift angle. If the polarization is too high the compensation will not occur, the meter reading will drop by simulating an increase in polarization or decrease in capacitance by opening switch 19 (which introduces another capacitance in series) and this is an indication that the cell is in poor condition and should be changed or replatinized. If the cell is in perfect condition, the opening of switch 19 will not cause any current decrease in the meter 16 (i.e. no drop in needle or deflection reading). Normally, switch 19 will be closed. If there is a drop in deflection, then the cell can be replaced without the need for inspecting the cell.

It will thus be seen that the use of the phase shift between the cell voltage source and synchronous switch 15 compensates the conductivity reading for changes in cell condition, while the use of the series capacitor 18 and shorting switch 19 provide an electrical means for determining cell condition.

An alternate form of the invention is shown in FIG. 4 and provides a check on cell condition without compensation of the meter indication. In FIG. 4 the fixed phase shifter 17 and the synchronous switch 15 of FIG. 1 are omitted. The meter is an A.C. indicating type and series capacitor 18 and shorting switch 19 of FIG. 1 are retained. The A.C. meter current magnitude will vary as the cosine of the electrical angle caused by the cell polarization for constant solution conductance. This means that when capacitor 18 is unshorted by opening switch 19 the resultant change in conductance indication is much greater when the cell polarization is high (low series capacitance) than when the polarization is low (high to infinite series capacitance). Consequently the magnitude of change of the conductance reading when capacitor 18 is unshorted by switch 19 is an indication of the cell condition. If the cell is in good condition, the opening of switch 19 will merely produce a slight or imperceptible drop in deflection of the meter. If the cell is in poor condition, that is, highly polarized, the drop in deflection is much greater and very noticeable. Consequently, the magnitude of the change in deflection reading (conductivity indication reading) is a function of the cell condition.

An important advantage of the system of FIG. 1 is that the conductivity indication is made independent of cell polarization over a range of conductivity cell conditions which otherwise would cause considerable conductivity indication change.

An important advantage for the systems of FIGS. 1 and 4 is that the cell condition can be determined electrically at the instrument without physical removal of the cell and subsequent mechanical inspection.

I claim:

1. A direct reading conductivity analyzer comprising a source of alternating current, means for deriving from said source an A.C. voltage which remains essentially constant in magnitude, a current transformer having a primary winding and a secondary winding, a capacitor in series with a conductivity cell and with said primary winding, a manually operable switch normally closed and in shunt to said capacitor, means for supplying said A.C. voltage to said series circuit of primary winding and capacitor, and a voltage amplifier and a meter arranged in series with said secondary winding.

2. A direct reading conductivity analyzer according to claim 1 wherein said meter is an A.C. meter, and the voltage supplied to said series circuit is of the order of 2 volts.

3. A direct reading conductivity analyzer according to claim 1, including a switch arranged in series between said amplifier and meter, and a phase shifter deriving energy from said source and driving said last switch at a frequency which is the same as is supplied to said conductivity cell, said A.C. voltage being both constant in magnitude and phase for a desired range of conductivity cell resistances.

4. A direct reading analyzer according to claim 3 wherein said deriving means includes a voltage regulator and a transformer coupled to said regulator, said last transformer including a primary winding coupled to said regulator, a first secondary winding across which said A.C. voltage is produced, and a second secondary winding forming part of said phase shifter, said shifter including a capacitor in series with a resistor connected across said second secondary winding.

5. A direct reading analyzer according to claim 3 wherein said last switch is an electrical switch composed of a bridge of four diodes, said phase shifter being connected across a diagonal of said bridge, the other diagonal of said bridge being connected to said amplifier and meter.

References Cited

UNITED STATES PATENTS 2,902,639   9/1959   Thayer et al. _____ 324—30
3,286,167   11/1966  Gwyn _____ 324—30

EDWARD E. KUBASIEWICZ, Primary Examiner

U.S. Cl. X.R.

324—60